United States Patent [19]
Kilheffer et al.

[11] Patent Number: 5,590,976
[45] Date of Patent: Jan. 7, 1997

[54] MOBILE PAVING SYSTEM USING AN AGGREGATE MOISTURE SENSOR AND METHOD OF OPERATION

[75] Inventors: Kenneth E. Kilheffer; Calvin L. Stegemoeller; Lesley T. Hays, all of Waco, Tex.

[73] Assignee: Akzo Nobel Ashpalt Applications, Inc., Waco, Tex.

[21] Appl. No.: 453,454

[22] Filed: May 30, 1995

[51] Int. Cl.$^6$ .................................................. E01C 19/00
[52] U.S. Cl. .................. 404/72; 404/84.05; 404/108; 198/959; 177/119; 366/8; 366/18; 366/37; 366/151.1; 366/153.3; 366/160.1
[58] Field of Search .................. 404/72, 84.05, 404/101, 108, 110; 366/1, 7, 8, 16, 23, 25

[56] References Cited

U.S. PATENT DOCUMENTS

| | | | |
|---|---|---|---|
| 3,260,176 | 7/1966 | Bowers | 404/11 |
| 3,353,798 | 11/1967 | Draper et al. | 366/8 |
| 3,453,939 | 7/1969 | Pollitz et al. | 404/84.05 |
| 3,478,830 | 11/1969 | Levesque et al. | 177/16 |
| 3,820,914 | 6/1974 | Zimmerman | 404/110 |
| 3,967,912 | 7/1976 | Parker | 404/84.05 |
| 4,012,160 | 3/1977 | Parker | 404/84.05 |
| 4,089,509 | 5/1978 | Morton et al. | 366/8 |
| 4,222,498 | 9/1980 | Brock | 222/58 |
| 4,298,288 | 11/1981 | Weisbrod | 366/8 |
| 4,475,818 | 10/1984 | Bialkowski | 366/17 |
| 4,506,982 | 3/1985 | Smithers et al. | 366/19 |
| 4,534,674 | 8/1985 | Cutler | 404/75 |
| 4,781,466 | 11/1985 | Zimmerman | 366/2 |
| 4,823,366 | 4/1989 | Williams | 377/2 |
| 5,044,819 | 9/1991 | Kilheffer et al. | 404/72 |
| 5,240,324 | 8/1993 | Phillips et al. | 366/132 |
| 5,294,210 | 3/1994 | Lemelson | 404/84.1 |
| 5,330,265 | 7/1994 | Keating, Jr. et al. | 366/7 |
| 5,376,950 | 12/1994 | Söderholm et al. | 346/16 |

Primary Examiner—Henry A. Bennett
Assistant Examiner—Pamela A. O'Connor
Attorney, Agent, or Firm—Baker & Botts, L.L.P.

[57] ABSTRACT

A mobile paving system (10) is provided that produces paving material while the mobile system (10) proceeds over a surface. The mobile paving system (10) includes an aggregate hopper (12) operable to hold aggregate for use in producing paving material and a mixer (24) operable to mix aggregate with remaining ingredients to produce paving material. A moisture sensor (47) is associated with the aggregate. The moisture sensor (47) is operable to measure moisture in the aggregate and to provide an output representing an amount of moisture measured. A processor (34) is operable to receive an input representing the amount of moisture measured. The processor (34) is further operable to determine a dry weight of aggregate by converting from to dry weight volume used to produce paving material using bulking effect data for the aggregate corresponding to the amount of moisture measured. A mobile paving system (10) is also provided that includes a scale (28) operable to measure and provide a signal representing the weight of aggregate being conveyed by a conveyor (22) to the mixer (24). The processor (34) is operable to receive the signal from the scale (28) and to determine a dry weight of the aggregate being conveyed from the weight measured and the amount of moisture measured.

27 Claims, 4 Drawing Sheets

0% MOISTURE

FIG. 2A

X% MOISTURE

FIG. 2B

BULKING EFFECT

|  | 0% MOISTURE | X% MOISTURE |
|---|---|---|
| PER CENT WATER BY WEIGHT | 0% | X% |
| WEIGHT PER CUBIC FOOT BEFORE DRYING | $M \frac{lbs.}{cu.ft.}$ | $N \frac{lbs.}{cu.ft.}$ |
| WEIGHT OF CUBIC FOOT AFTER DRYING | M lbs. | $N \times \left(\frac{100-X}{100}\right)$ lbs. |

MOBILE PAVING SYSTEM USING AN AGGREGATE MOISTURE SENSOR AND METHOD OF OPERATION

TECHNICAL FIELD OF THE INVENTION

This invention relates in general to the field of road construction equipment and more particularly to a mobile paving system using an aggregate moisture sensor and a method of operation.

BACKGROUND OF THE INVENTION

Mixed paving material such as bituminous slurry is used for high quality paving surfaces for roads, parking lots and other surfaces. The production of bituminous slurry, as with many paving materials, requires the mixture of several ingredients. The quality of the bituminous slurry or other paving material is directly dependent on the relative amounts of these ingredients. Prior paving systems for applying paving material to a surface include producing paving material in a hot mix plant and transporting the paving material to the surface to be paved. Another prior paving system includes a mobile paving system that produces and applies paving material as the paving system proceeds down the surface to be paved. One such monitored mobile paving system is disclosed in U.S. Pat. No. 5,044,819 entitled "Monitored Paving System."

It is important with respect to a mobile paving system for an operator to apply a uniform paving surface over the duration of a project. One problem encountered is the difficulty in accurately measuring the weight of aggregate being added to the mix in producing the paving material. The aggregate commonly contains moisture such that the total weight of the aggregate includes some water weight. This amount of moisture is often referred to as the "percent moisture" of the aggregate which means that water makes up the given percent of the total weight of the aggregate.

Some prior paving systems have used a scale for weighing the aggregate as it is transported to a mixer prior to being mixed with other ingredients to produce the paving material. The monitored paving system of U.S. Pat. No. 5,044,819 includes such a scale. However, this prior paving system did not include measurement of moisture in the aggregate.

A moisture sensor for measuring the percent moisture of aggregate called the AQUALIZER™ MOISTURE SENSOR is commercially available from CEDARAPIDS®/STANDARD HAVENS®. This moisture sensor is used in hot mix plants to measure the percent moisture of aggregate after the aggregate leaves an aggregate hopper on its way to be mixed to form the paving material. This moisture sensor shines infrared light on the aggregate and analyzes the resulting reflected light to determine the percent moisture of the aggregate.

SUMMARY OF THE INVENTION

A need has arisen for a mobile paving system having an aggregate moisture sensor that allows more uniform production and application of paving material to a surface to be paved.

In accordance with the present invention, a mobile paving system using an aggregate moisture sensor and a method of operation are provided that substantially eliminate or reduce the disadvantages and problems associated with previously developed paving systems.

According to one embodiment of the present invention, a mobile paving system is provided that is operable to produce paving material while the mobile system proceeds over a surface. The mobile paving system includes an aggregate hopper operable to hold aggregate for use in producing paving material and a mixer operable to mix aggregate with remaining ingredients to produce paving material. A moisture sensor is associated with the aggregate. The moisture sensor is operable to measure moisture in the aggregate and to provide an output representing an amount of moisture measured. A processor is operable to receive an input representing the amount of moisture measured. The processor is further operable to determine a dry weight of aggregate used to produce paving material by converting from volume to dry weight using bulking effect data for the aggregate corresponding to the amount of moisture measured.

According to another embodiment of the present invention, a mobile paving system is also provided that includes a scale operable to measure and provide a signal representing the weight of aggregate being conveyed to a mixer. The processor is operable to receive the signal from the scale and to determine a dry weight of the aggregate being conveyed from the weight measured and the amount of moisture measured.

According to a further embodiment of the present invention, a method of operating a mobile paving system to produce paving material is provided. Aggregate to be used in producing paving material is provided, and an amount of moisture in the aggregate is measured. A dry weight of aggregate used to produce paving material is then determined by converting from volume to dry weight bulking effect data for the aggregate corresponding to the amount of moisture measured. The flow of the aggregate to a mixer is then controlled in response to the determined dry weight. The paving material is produced by mixing remaining materials with the aggregate.

One technical advantage of the present invention is the use of a moisture sensor in a mobile paving system to accurately measure the moisture of the aggregate such that accurate materials ratios can be maintained. Another technical advantage of the present invention is the use of the percent moisture measurement in a mobile paving system including an aggregate scale to determine the portion of the weight of the aggregate that is attributable to water.

A further technical advantage of the present invention is the use of a moisture sensor in conjunction with bulking effect data in order to accurately determine the dry weight of aggregate being used without weighing the aggregate. By using the bulking effect data, the present invention allows an operator of a mobile paving system to accurately determine the dry weight of aggregate being used even though the paving system does not include a scale for weighing the aggregate.

BRIEF DESCRIPTION OF THE DRAWINGS

A more complete understanding of the present invention and advantages thereof may be acquired by reference to the following description taken in conjunction with the accompanying drawings in which like reference numbers indicate like features and wherein.

DETAILED DESCRIPTION OF THE INVENTION

Figure 1:
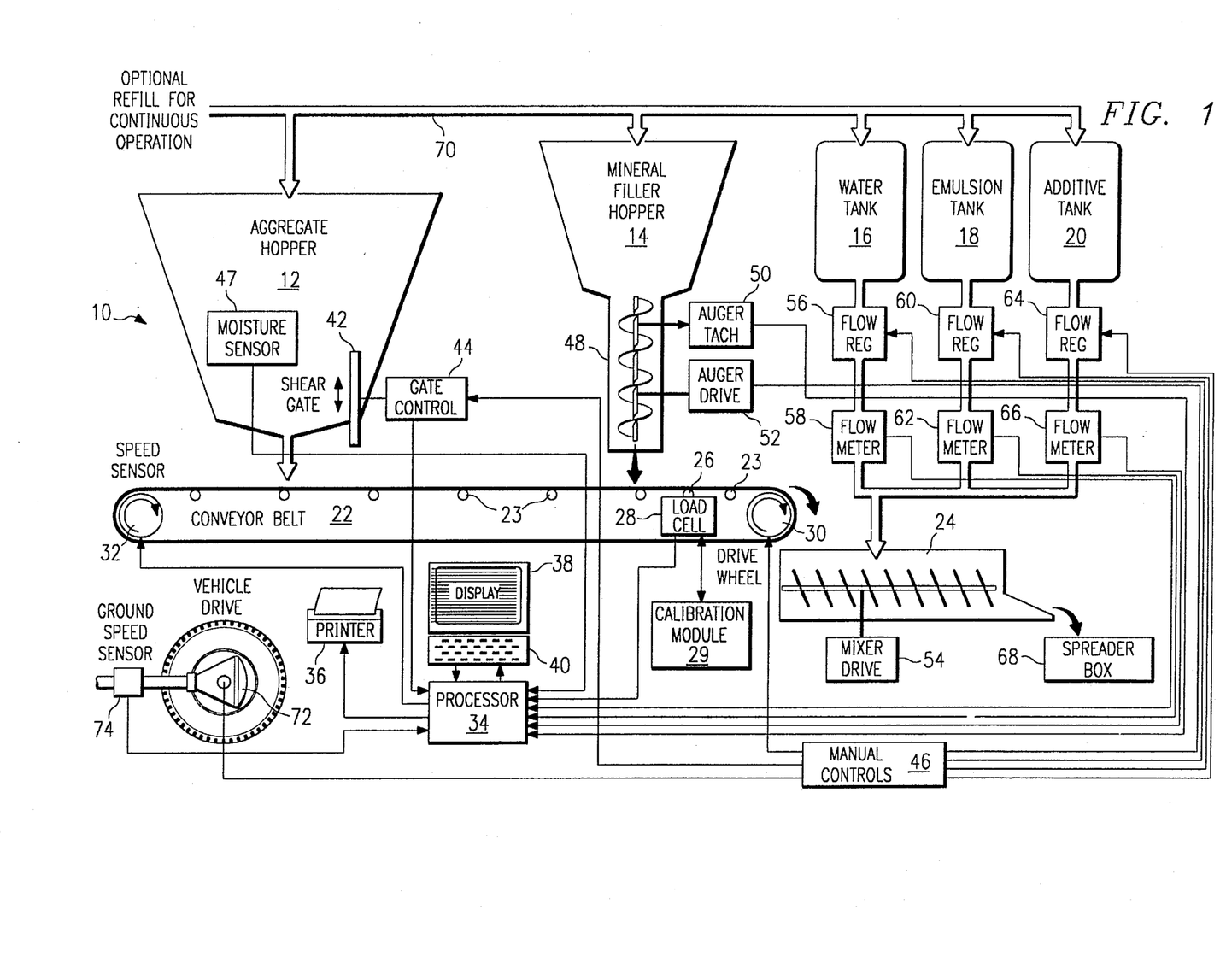
FIG. 1 is a block diagram of a mobile paving system constructed according to the teachings of the present invention.

FIG. 1 is a block diagram of a mobile paving system, indicated generally at 10, constructed according to the teachings of the present invention. Paving system 10 comprises an aggregate hopper 12 operable to store aggregate which may comprise, for example, stone, slag or gravel. Paving system 10 further comprises a mineral filler hopper 14 for storing mineral filler which may comprise, for example, Portland cement. Paving system 10 further comprises a water tank 16, an emulsion tank 18 and an additive tank 20. The water tank 16 is operable to store water necessary for the bituminous slurry mix produced by paving system 10. Emulsion tank 18 stores the bituminous emulsion or other suitable binding agent, and additive tank 20 stores a chemical additive which may comprise a catalyst or inhibitor or stabilizer.

It should be understood that paving system 10 is presented herein as a bituminous slurry system solely for the purposes of teaching the present invention. The present invention is equally applicable to any mobile paving system that requires the mixture of any number of dry or liquid components. For example, other embodiments of the paving system of the present invention could provide for the production of concrete surface, slurry, microsurfacing, cold tar surfaces or any other surface requiring the mixture of aggregate material with a suitable binding agent. The teachings of the present invention are also equally applicable to batch and refillable paving systems. A batch system is one in which a given amount of ingredients are carried to the surface to be paved at which point the ingredients are mixed to produce the paving material. In a refillable system, the ingredients can be refilled as the system operates to allow continuous operation without stopping to reload. It should be understood that the teachings of the present invention are not limited by the presentation of the embodiments of the mobile paving system shown in FIGS. 1 through 4B.

In the embodiment of FIG. 1, aggregate hopper 12 is positioned proximate a conveyor belt 22 that conveys the aggregate and the mineral filler to a mixer 24. The conveyor belt comprises a plurality of idlers 23 used to support the conveyor belt. A single idler 26 near the discharge end of the conveyor belt 22 may be coupled to a load cell 28. Load cell 28 is operable to weigh the amount of material transported on conveyor belt 12 in a region above idler 26. Alternatively, a multiple idler scale could be used in place of load cell 28 that would require a corresponding number of idlers 26 coupled thereto. In another embodiment of the present invention, paving system 10 comprises a batch system or other system that does not include a load cell 28 or other weighing device.

Conveyor belt 22 is actuated by a drive wheel 30 proximate the discharge end of conveyor belt 22. A speed sensor 32 is also coupled to conveyor belt 22 and transmits a signal to a processor 34 as to the speed of conveyor belt 22. If present, load cell 28 also transmits a signal to processor 34. Load cell 28 might also comprise a calibration module 29. Calibration module 29 is operable to control the calibration and initialization of load cell 28. The addition of calibration module 29 allows load cell 28 to allow for variances in the weight of conveyor belt 22 during calibration and initialization to arrive at an average weight acting upon load cell 28.

Processor 34 is coupled to a display 38 and input/output devices such as a printer 36 and a keypad 40. Printer 36 and keypad 40 are examples of user interfaces. Any suitable user interface could be used. The illustrated embodiment is not intended nor should be construed to limit the scope of the present invention. Processor 34 may comprise, for example, a microprocessor-based control system including a storage device and memory. Processor 34 may comprise a plurality of output modules and input modules mounted on an I/O rack assembly. Processor 34 may further include a real time clock such that rates of application and material usage may be calculated. Further, printer 36 may comprise, for example, a forty column impact printer. Display 38 and keypad 40 may comprise, for example, an integrated display and entry panel.

The amount of aggregate delivered by aggregate hopper 12 on conveyor belt 22 may be controlled by a gate 42. Gate 42 is coupled to a gate control 44. Gate 42 contacts the aggregate as the aggregate is discharged from the aggregate hopper by conveyor belt 22 and establishes the vertical height of the aggregate material on conveyor belt 22. Gate control 44 may use hydraulic, electrical or other known mechanical means to control the height of gate 42 relative to the conveyor belt 22. Gate 42 has numerous level settings across a continuum from open to shut where each level setting allows a different rate of flow out of aggregate hopper 12 for a constant speed of conveyor belt 22. The illustrated embodiment uses feedback so gate control 44 provides a level signal to processor 34 indicating the level setting of gate 42. In other embodiments, there is no feedback, and the level setting can be entered manually into processor 34 or provided by other suitable means.

Gate control 44 may be controlled from manual controls 46. According to one embodiment of the present invention, an operator of paving system 10 has access to manual controls 46 as well as to display 38 and keypad 40 to control the operation of paving system 10. Alternatively, the amount of aggregate may be controlled by varying the speed of conveyor belt 22 and by maintaining a constant gate level setting such that there is a constant cross-sectional area of aggregate being conveyed. In addition, a combination of a gate 42 and a variable speed conveyor belt 22 can be used. In one embodiment of the present invention, changing speed does not change per cent emulsion because conveyor belt 22 and the emulsion pump are tied together.

In the embodiment of FIG. 1, a moisture sensor 47 is mounted in aggregate hopper 12. Moisture sensor 47 is operable to measure a percent moisture of the aggregate and to provide a moisture signal to processor 34. Moisture sensor 47 may comprise an AQUALIZER™ MOISTURE SENSOR available from CEDARAPIDS®/STANDARD HAVENS®, or other suitable moisture sensor operable to accurately measure the moisture in the aggregate. It should be understood that the positioning of moisture sensor 47 is not limited to that of the illustrated embodiment. Other types of moisture sensors and other positions are possible provided moisture sensor 47 is operable to measure the moisture in the aggregate.

The mineral filler from hopper 14 is discharged onto the conveyor belt 22 through an auger 48. An auger tachometer 50 senses the rotational speed of auger 48 and transmits a signal indicative of the rotational speed of auger 48 to processor 34. In other embodiments, a pulse generator creates pulses that are counted as mineral filler is discharged. The amount of mineral filler discharged can be correlated to the number of counts. The current count can then be used to determine the total amount of mineral filler that has been discharged. In the illustrated embodiment, auger 48 is actuated by an auger drive train 52 which may also be controlled from manual controls 46. In another embodiment of the present invention, such control can comprise automatic control by processor 34.

The combination of the aggregate and mineral filler is discharged from conveyor belt 22 into a mixer 24 which is actuated by a mixer drive train 54. Mixer drive train 54 may also be controlled from manual controls 46 such that an operator of system 10 may vary the speed of mixer 24 during an operation.

Water from water tank 16 is discharged into mixer 24 after it is passed through a flow regulator 56 and a flow meter 58. Flow regulator 56 may be remotely controlled from manual controls 46. In another embodiment of the present invention, such control can comprise automatic control by processor 34. Flow meter 58 may comprise an insertion-style flow transmitter. Flow meter 58 transmits a signal associated with the amount of water flowing from water tank 16 into mixer 24 to processor 34.

Similarly, emulsion tank 18 discharges bituminous emulsion into mixer 24 through a flow regulator 60 and a flow meter 62. Flow regulator 60 may comprise a variable displacement or variable speed pump which may be remotely controlled from manual controls 46. In another embodiment of the present invention, such control can comprise automatic control by processor 34. According to an alternate embodiment of the present invention, flow regulator 60 may be omitted and the ratio of the amount of aggregate material to the amount of bituminous emulsion may be adjusted by adjusting the amount of aggregate material using gate 42 and gate control 44 or by adjusting the speed of conveyor belt 22 as discussed previously.

Additive tank 20 discharges the additive into mixer 24 through a flow regulator 64 and a flow meter 66. Flow regulator 64 may comprise a conventional valve or a variable speed or variable displacement pump which may be remotely controlled from manual controls 46 through a variety of known methods. Mixer 24 mixes the aggregate, mineral filler, water, bituminous emulsion and additive and discharges the resulting bituminous slurry mixture into a spreader box 68 which can be used to apply it evenly on the surface to be paved as paving system 10 proceeds forward.

An optional refill path 70 is shown in FIG. 1 coupled to aggregate hopper 12, mineral filler hopper 14, water tank 16, emulsion tank 18 and additive tank 20. It should be understood that refill path 70 may comprise a different mechanical structure for each of these separate storage facilities within system 10. For example, refill paths 70 may comprise a system of hoses and pumps coupled to water tank 16, emulsion tank 18 and additive tank 20 to refill these tanks. Further, refill path 70 may comprise a separate conveyor belt for conveying aggregate from a nurse truck (not shown) into aggregate hopper 12 within system 10. Similarly, refill path 70 may comprise a separate system to refill mineral filler hopper 14.

It should be understood that with respect to a batch paving system, optional refill path 70 is not generally available. As mentioned above, a batch system is a system in which a given amount of ingredients are carried to the surface to be paved. The ingredients are then mixed to produce the paving material, and the paving material is applied.

Paving system 10 comprises a mobile system situated on a suitable carrier chassis, having a drive train 72. Drive train 72 may have a ground speed sensor 74 coupled thereto. Ground speed sensor 74 transmits a signal indicative of the ground speed of the vehicle to processor 34. Alternatively, ground speed sensor 74 may comprise a variety of devices such as sensors directly coupled to the wheels of the vehicle, radar devices or sensor wheels directly contacting the surface to be paved as it passes below the vehicle during the paving operation. Additionally, the speed of the vehicle may be remotely controlled from manual controls 46 by coupling drive train 72 to manual controls 46 by using known methods.

In operation, processor 34 receives continuous inputs from load cell 28 (if present), speed sensor 32, gate control 44, moisture sensor 47, ground sensor 74, auger tachometer 50, and flow meters 58, 62 and 66. In other embodiments, gate control 44 does not provide an input to processor 34, and the gate level can be input by an operator into processor 34. Some features of the operation of processor 34 and paving system 10 are described in U.S. Pat. No. 5,044,819 entitled "Monitored Paving System," the disclosure of which is incorporated herein by reference.

In the embodiment of FIG. 1, moisture sensor 47 provides a moisture signal to processor 34. In this embodiment, moisture sensor 47 comprises an AQUALIZER™ MOISTURE SENSOR available from CEDARAPIDS®/STANDARD HAVENS®. Moisture sensor 47 is operable to provide a moisture signal to processor 34 that indicates the percent moisture of the aggregate. The percent moisture represents the percent of the total weight of the aggregate that is water. For example, 5% moisture indicates that the aggregate has 5% water by weight. Thus, 100 pounds of aggregate would comprise 95 pounds dry weight of aggregate and 5 pounds of water. Dry weight for aggregate refers to the weight where there is 0% moisture.

In the illustrated embodiment, processor 34 receives a signal from gate control 44 which indicates the level setting of gate 42. As pointed out above, the level setting of gate 42 can be input manually by an operator in other embodiments. The level setting of gate 42 coupled with the speed of conveyor belt 22 determines the flow of aggregate with respect to volume per unit of time. In the illustrated embodiment, processor 34 is operable to calculate and to display this flow rate. In another embodiment, a pulse generator creates a pulse for each revolution of conveyor 22. These pulses can be counted giving a total number of pulses or clicks. The amount of aggregate can be correlated with the number of clicks. In this manner, processor 34 can be calibrated to determine the weight of aggregate discharged from hopper 12 from the total number of clicks. Processor 34 can then determine the total weight of aggregate at any point in time after being provided with the number of clicks.

In a refillable paving system or other embodiment of the present invention having load cell 28, processor 34 uses the moisture signal received from moisture sensor 47 and the weight measurement provided by load cell 28 to determine the dry weight of the aggregate being dumped into mixer 24. Processor 34 can determine the total weight of the aggregate from the signal provided by load cell 28 and can subtract an appropriate weight for water as indicated by the moisture measurement. In this manner, processor 34 can display on display 38 the flow of aggregate with respect to dry weight as the aggregate is being added to mixer 24. This dry weight information allows an operator to produce and maintain an accurate materials ratio.

In a batch system or other system embodiment of the present invention where there is no load cell 28 for weighing the aggregate, processor 34 does not receive a signal indicating the total weight of the aggregate. In some such embodiments, a total weight is available from the clicks counted for the aggregate. In other embodiments, processor 34 can be provided with bulking effect data representing the bulking effect of the aggregate in aggregate hopper 12 corresponding to the measured percent moisture. Bulking effect data is described in more detail with respect to FIGS. 2A through 2C. In general, the bulking effect data describes the effect of moisture on the density of the aggregate.

Where processor 34 knows the flow of aggregate in terms of volume, processor 34 is operable to calculate and display a flow of the aggregate in dry weight using the measured amount of moisture, the bulking effect data and the flow in volume. In one embodiment, processor 34 can calculate the flow of the aggregate in volume per unit of time or total volume using the gate level setting and the speed of conveyor belt 22. Processor 34 is then operable to convert the flow from volume into dry weight using the bulking effect data corresponding to the measured percent moisture.

A technical advantage of the present invention is the use of bulking effect data to determine a flow of the aggregate in dry weight from a flow in terms of volume. Consequently, an operator of paving system 10 can accurately know the dry weight of aggregate being added to mixer 24. This allows an operator to produce and maintain an accurate materials ratio even though the moisture content of the aggregate may vary over the span of the day and over the duration of a project.

Figure 2A:
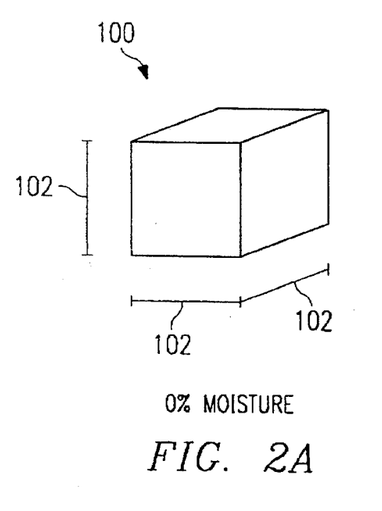
FIGS. 2A, 2B and 2C illustrate the bulking effect caused by moisture in aggregate.
Figure 2B:
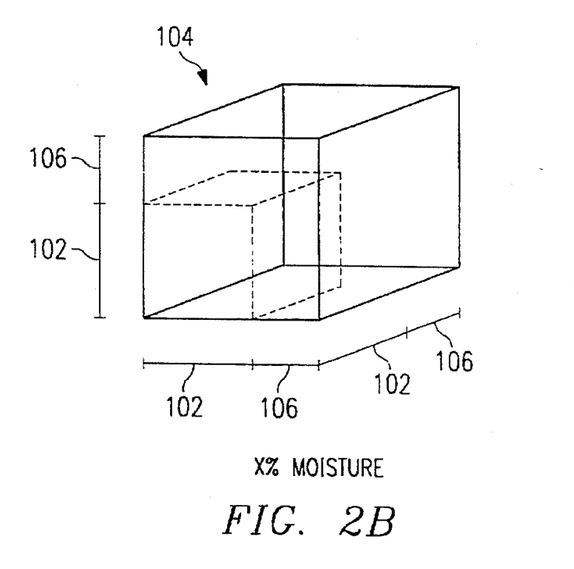
Figure 2C:
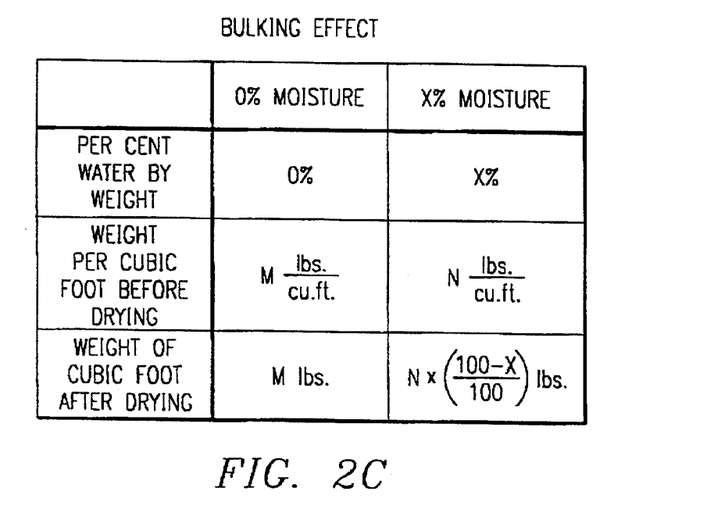

FIGS. 2A, 2B and 2C illustrate bulking effect caused by moisture in aggregate. FIG. 2A illustrates a volume of zero percent moisture aggregate, indicated generally at 100. As shown, aggregate 100 occupies a volume where each side has a length 102. In the illustrated embodiment, length 102 measures one foot such that the volume is one cubic foot.

FIG. 2B illustrates a volume of aggregate having X percent moisture, indicated generally at 104. Aggregate 104 occupies a larger volume than aggregate 100 of FIG. 2A. Aggregate 104 occupies a cube having sides equal to length 102 plus an expansion 106. Aggregate 104 represents the effect of X percent moisture on aggregate 100 of FIG. 2A. In other words, if X percent moisture by weight were added to aggregate 100, the resulting volume of aggregate is shown in FIG. 2B. As can be seen, the density of aggregate 104 is smaller than the density of aggregate 100. The change in density varies depending upon the type of aggregate and can be measured empirically. Expansion 106 can be referred to as the bulking effect of the aggregate caused by the X percent moisture.

FIG. 2C compares zero percent moisture aggregate 100 and X percent moisture aggregate 104 of FIGS. 2A and 2B. As shown in FIG. 2C, the zero percent moisture aggregate has 0% water by weight. On the other hand, the X percent moisture has X percent water by weight. This is true by definition. Typically, X ranges from 0 to 6 for aggregate commonly used in paving surface applications. As shown in FIG. 2C, assume the weight per cubic foot before drying of the zero percent moisture aggregate is equal to M pounds per cubic foot. In this case, the weight of the aggregate in that cubic foot after drying would be equal to M pounds. This makes sense because the zero percent moisture aggregate contained 0% water by weight.

On the other hand, assume the X percent moisture aggregate has a weight equal to N pounds per cubic foot before drying. In this case, the weight of the aggregate in that cubic foot after drying will be equal to N((100X)/100) pounds. The X percent water weight is removed by drying leaving only dry aggregate.

As should be understood, for a given type of aggregate, the magnitude of N will be smaller than the magnitude of M due to the bulking effect. In addition, it should be clear that, given one cubic foot of moist aggregate that is weighed before and then after drying, the weight of the aggregate before drying will be larger than the weight of the aggregate after drying because the water is removed. Of course, the volume of space occupied by the aggregate will also decrease after drying.

The following tables give bulking effect data measured for three typical aggregate samples. The density before drying shows the weight in pounds of one cubic foot of moist aggregate. The weight after drying shows the weight in pounds after one cubic foot of moist aggregate is dried to remove moisture. Of course, the dried aggregate will no longer occupy a volume of one cubic foot.

TABLE 1

BULKING EFFECT DATA
AGGREGATE SAMPLE #1 (Type II)

| % Moisture | Density Before Drying | Weight After Drying |
|---|---|---|
| 0.00 | 101.1 lbs/cu. ft. | 101.1 lbs. |
| 1 | 93.2 | 92.3 |
| 2 | 83.7 | 82.0 |
| 3 | 82.0 | 79.5 |
| 4 | 81.2 | 78.0 |
| 5 | 77.6 | 73.7 |
| 6 | 76.2 | 71.6 |

TABLE 2

BULKING EFFECT DATA
AGGREGATE SAMPLE #2 (Type II)

| % Moisture | Density Before Drying | Weight After Drying |
|---|---|---|
| 0.00 | 101.3 lbs/cu. ft. | 101.3 lbs. |
| 1 | 95.1 | 94.1 |
| 2 | 83.4 | 81.8 |
| 3 | 76.0 | 73.7 |
| 4 | 73.5 | 70.6 |
| 5 | 72.4 | 68.8 |
| 6 | 74.9 | 70.4 |

TABLE 3

BULKING EFFECT DATA
AGGREGATE SAMPLE #3 (Type II)

| % Moisture | Density Before Drying | Weight After Drying |
|---|---|---|
| 0.00 | 97.8 lbs/cu. ft. | 97.8 lbs. |
| 1 | 88.2 | 87.4 |
| 2 | 82.3 | 80.7 |
| 3 | 81.8 | 79.3 |
| 4 | 80.2 | 77.3 |
| 5 | 79.3 | 75.3 |
| 6 | 76.5 | 71.9 |

Bulking effect data such as that shown in the above tables can be provided to and stored by processor 34 of paving system 10. Processor 34 can store bulking effect data and access it such that the flow of aggregate can be converted from volume to dry weight.

For example, if the aggregate of TABLE 1 were being used by paving system 10, processor 34 might make the following conversion. If moisture sensor 47 provides a moisture signal indicating 4% moisture, then the bulking effect data accessible by processor 34 indicates that at 4% moisture the aggregate has a density of 81.2 pounds per cubic foot which translates to 78.0 pounds of dry aggregate in that cubic foot. Thus, processor 34 can multiply the volume of aggregate by 78 to convert to dry weight. For example, if the volume of aggregate were 2 cubic feet, then the weight is 156 pounds where the aggregate has 4% moisture. As can be seen from TABLEs 1, 2 and 3, the difference in the dry weight of a cubic foot of moist aggregate after drying can be significant. For example, the difference in TABLE 1 from 1% moisture to 6% moisture is the difference between 92.3 pounds to 71.6 pounds after drying a cubic foot of moist aggregate.

Figure 3A:
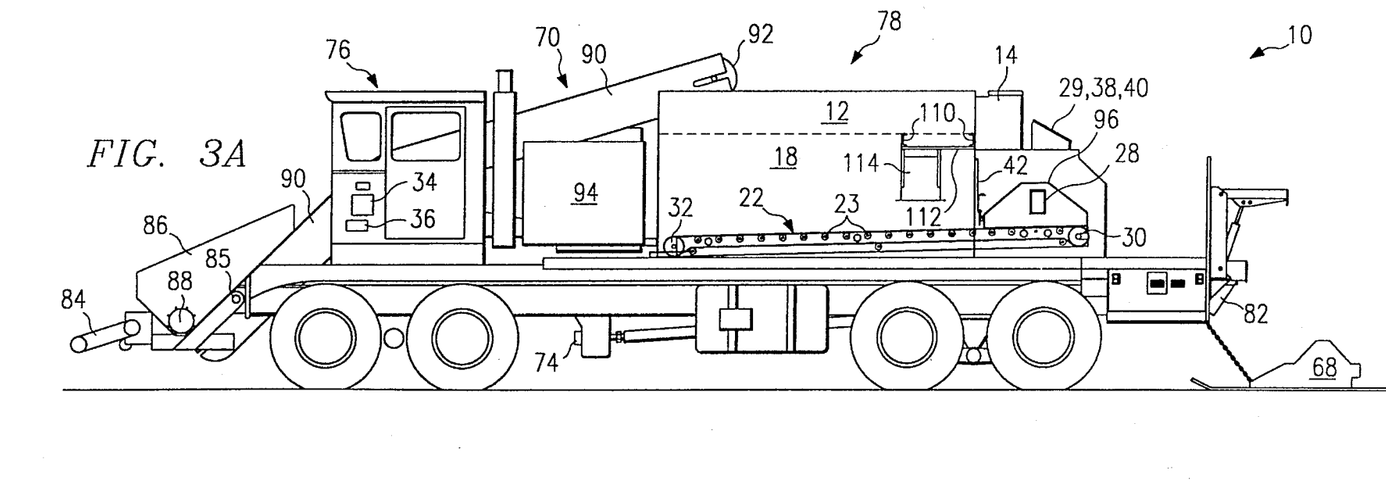
FIGS. 3A and 3B are top and side views of one embodiment of a mobile paving system constructed according to the teachings of the present invention.
Figure 3B:
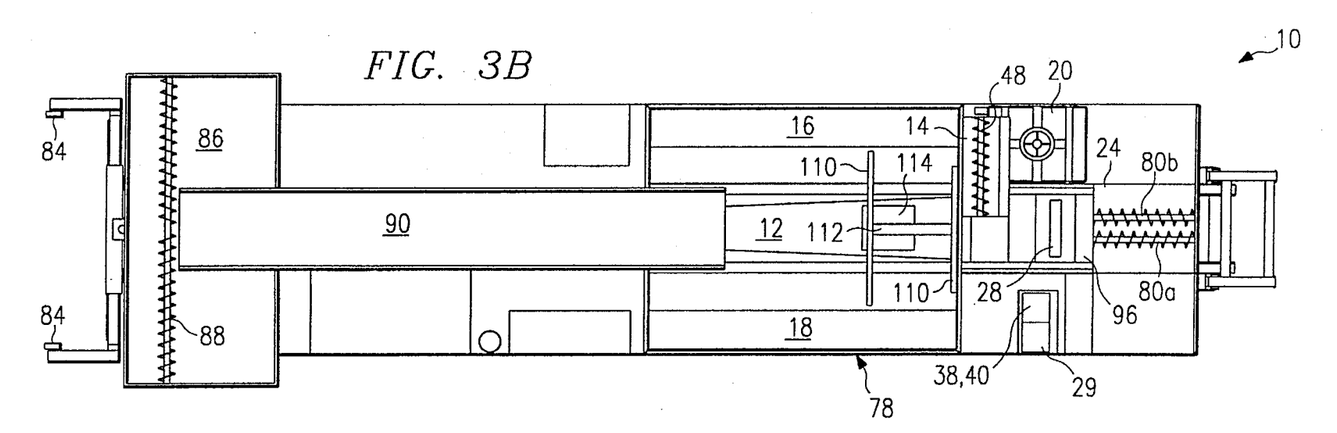

FIGS. 3A and 3B comprise side and top views respectively of one embodiment of paving system 10 mounted on a vehicle, indicated generally at 76. Vehicle 76 illustrated in FIGS. 3A and 3B can be used to transport paving system 10 to a job site by conventional highway travel and can proceed at a suitable speed, for example on the order of one-half to three miles per hour, as the paving material produced by paving system 10 is applied behind vehicle 76. Vehicle 76 may comprise a one-man cab and eight wheels having super single tires. Vehicle 76 may further comprise rear tandem axle set drives and may have front axle steering. Vehicle 76 is disclosed solely for the purposes of teaching the embodiment shown in FIGS. 3A and 3B and should not be construed to limit the scope of the present invention. In another embodiment of the present invention, vehicle 76 may comprise a batch truck or other batch system as described above.

FIGS. 3A and 3B, illustrate the placement of many of the components of paving system 10 shown in FIG. 1 as they are mounted on vehicle 76. A rear storage area, indicated generally at 78, comprises water tank 16, aggregate hopper 12 and emulsion tank 18. Mineral filler hopper 14 is disposed rearwardly of water tank 16. Mineral filler auger 48 can be seen in FIG. 3B running the width of mineral filler hopper 14.

Conveyor belt 22 is shown in FIG. 3A to comprise drive wheel 30, speed sensor 32 and idlers 23. In operation, conveyor 22 conveys aggregate from aggregate hopper 12, beneath gate 42 and discharges the aggregate into mixer 24. In the illustrated embodiment, load cell 28 is located above idler 26 downstream on conveyor belt 22 from gate 42. As mentioned above, a batch system embodiment might not include idler 26 or load cell 28.

Mixer 24 is shown in FIG. 3B to comprise dual rotating paddle assemblies 80a and 80b. During the operation of mixer 24, the combination of the mineral filler from mineral filler hopper 14 and the aggregate from aggregate hopper 12 are discharged by conveyor 22 into mixer 24. A combination of the water and additive is sprayed using a spray bar (not shown) over this mixture as it enters mixer 24. The emulsion is pumped from emulsion tank 18 into mixer 24 and the dual rotating paddle assemblies 80a and 80b complete the mixing of the emulsion and the wetted mixture of aggregate and mineral filler. The mixed bituminous slurry paving material is then discharged into spreader box 68 through a chute 82 which can be seen in FIG. 3A.

An operator is positioned next to mixer 24 at the rear of vehicle 76. From this position, the operator has access to keypad 40 and display 38 and can visually inspect the paving material as it is discharged from chute 82 into spreader box 68. Further, the operator has access to manual controls from this point which can control the ground speed of vehicle 76 and the amount of emulsion, water and additive discharged into mixer 24. Further, the operator may open or close gate 42 from this point to increase or decrease the amount of aggregate being fed in mixer 24. Additionally, the operator may regulate the amount of mineral filler fed into mixer 24 by regulating auger drive 52. The operator is shown the flow rate of aggregate in weight per unit of time on display 38 by processor 34. In this manner, using the information displayed to the operator by processor 34 the operator can maintain the desired consistency and quality of paving material being deposited by system 10 behind vehicle 76.

In the illustrated embodiment, moisture sensor 47 (not shown) is positioned inside a housing 114 which is mounted in aggregate hopper 12 using support members 110 and 112. Support members 110 and 112 are coupled to aggregate hopper 12 so as to provide a mounting surface for housing 114. Housing 114 comprises a rectangular box having an open bottom end. The positioning of moisture sensor 47 is shown in more detail in FIGS. 4A and 4B.

Figure 4A:
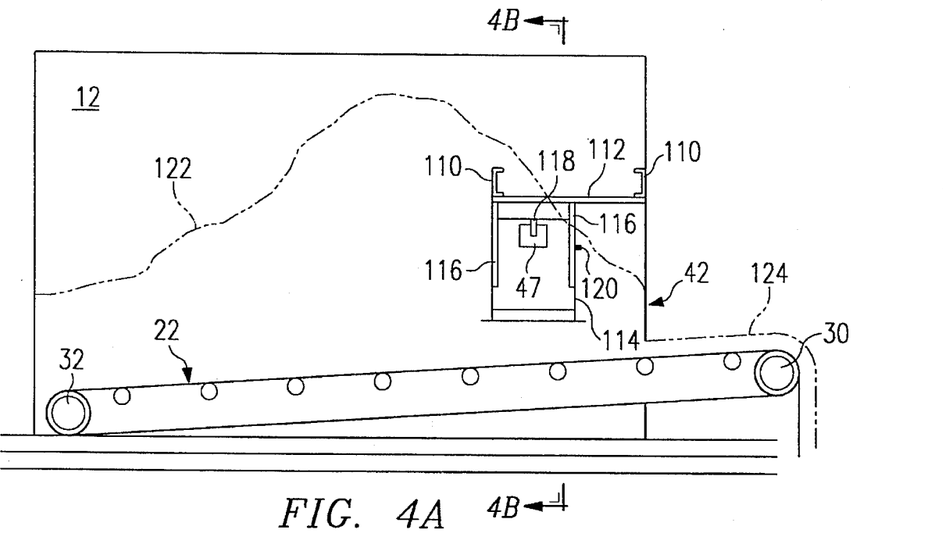
FIGS. 4A and 4B are a side and front cross sectional view of the mobile paving system of FIGS. 3A and 3B.
Figure 4B:
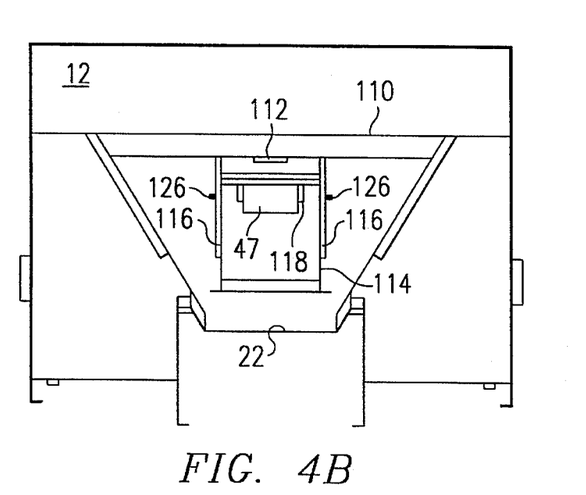

FIGS. 4A and 4B are a side and front cross sectional view of moisture sensor 47 mounted in hopper 12. As shown in FIG. 4A, moisture sensor 47 is mounted above conveyor belt 22. Support members 110 and 112 provide a mounting surface. Side support members 116 are coupled to support member 112. Housing 114 is movably coupled to side support members 116. Mounting member 118 is coupled to the inside top of housing 114 and holds moisture sensor 47. A fastener 120 provides a means for holding housing 114 in place. It should be understood that moisture sensor 47 could be positioned in other suitable places. The illustrated embodiment is not intended nor should be construed to limit the scope of the present invention.

The aggregate in aggregate hopper 12 has a profile as indicated generally by 122. However, housing 114 acts to shield moisture sensor 47 from the aggregate and to ensure that moisture sensor 47 maintains a uniform distance from the aggregate. Housing 114 comprises an open bottom providing access to the aggregate. The distance from moisture sensor 47 to the opening of housing 114 does not change during operating of paving system 10. This distance changes only if the operator repositions housing 114. After the aggregate passes through gate 42, the aggregate has a profile as indicated generally by 124.

FIG. 4B is a front cross sectional view of the mounting of moisture sensor 47. As is shown, the bottom of housing 114 is positioned above conveyor belt 22. Side support members 116 are coupled to support member 110. Housing 114 is movably coupled to side support members 116. Fasteners 126 provide means for holding housing 114 in place.

In the illustrated embodiment, moisture sensor 47 is maintained at a uniform height above the aggregate. In this embodiment, moisture sensor 47 measures the moisture in the aggregate by shining infrared light on the aggregate and measuring the reflected light and comprises an AQUALIZER™ MOISTURE SENSOR. It should be understood that other moisture sensors can be used in the paving system of the present invention. A feature of moisture sensor 47 is that it accurately measures the amount of moisture in the aggregate and provides that information to processor 34.

The mobile paving system for producing and applying paving material of the present invention includes an aggregate moisture sensor. A processor is operable to receive a moisture measurement and to determine the dry weight of aggregate using the moisture measurement. In one embodiment of the present invention, the paving system includes a scale for measuring the weight of the moist aggregate that is being dropped into the mixer. In this embodiment, the processor uses the moisture measurement from the moisture sensor to determine the dry weight of the aggregate being dumped into the mixer. The processor subtracts an appropriate number representing the weight of water in the aggregate. In another embodiment of the present invention, a scale is not included. In this embodiment, the processor uses the moisture measurement along with bulking effect data accessible by the processor. This bulking effect data can be measured for the aggregate being used. The processor can use the moisture measurement and bulking effect data to convert the aggregate flow from volume to dry weight in order to accurately determine the dry weight of aggregate being dumped into the mixer.

Although the present invention has been described in detail, it should be understood that various changes, substitutions and alterations can be made hereto without departing from the spirit and the scope of the invention as defined by the appended claims.

What is claimed is:

1. A mobile paving system operable to produce paving material while the mobile system proceeds over a surface, comprising:

an aggregate hopper operable to hold aggregate for use in producing paving material;

a mixer operable to mix aggregate with remaining ingredients to produce paving material;

a moisture sensor associated with the aggregate, the moisture sensor operable to measure moisture in the aggregate and to provide an output representing an amount of moisture measured; and a processor operable to receive an input representing the amount of moisture measured, the processor further operable to determine a dry weight of aggregate used to produce paving material by converting from volume to dry weight using bulking effect data for the aggregate corresponding to the amount of moisture measured.

2. The mobile paving system of claim 1, wherein the moisture sensor is operable to provide as the output a signal representing the amount of moisture measured, and the processor is coupled to receive as the input the signal from the moisture sensor.

3. The mobile paving system of claim 1, further comprising a gate coupled to the aggregate hopper, the gate having a gate level setting wherein the gate level setting defines a cross-sectional area of aggregate flowing out of the aggregate hopper.

4. The mobile paving system of claim 3, further comprising a conveyor positioned to receive aggregate from the aggregate hopper and operable to convey the aggregate to the mixer.

5. The mobile paving system of claim 4, wherein the processor is coupled to receive a signal indicating the gate level setting of the gate and a signal indicating the speed of the conveyor, the processor further operable to determine the flow of the aggregate in volume using the cross-sectional area set by the gate level setting and the speed of the conveyor.

6. The mobile paving system of claim 1, wherein the moisture sensor is operable to measure moisture in terms of a percent moisture of the aggregate and to provide the percent moisture measured as the amount of moisture measured.

7. The mobile paving system of claim 6, wherein the bulking effect data comprises a plurality of dry weight measurements of the aggregate corresponding to a plurality of percent moisture measurements.

8. The mobile paving system of claim 1, wherein the processor is operable to display the flow of the aggregate in dry weight to an operator of the mobile paving system.

9. The mobile paving system of claim 1, wherein the moisture sensor is mounted inside the aggregate hopper.

10. The mobile paving system of claim 1, wherein the moisture sensor is mounted outside the aggregate hopper.

11. The mobile paving system of claim 9, wherein the moisture sensor is mounted inside a housing having an open bottom end and movably coupled to the aggregate hopper.

12. The mobile paving system of claim 1, wherein the mobile paving system is mounted on a vehicle operable to proceed over a surface to be paved.

13. A mobile paving system operable to produce paving material while the mobile system proceeds over a surface, comprising:

an aggregate hopper operable to hold aggregate for use in producing paving material;

a mixer operable to mix aggregate with remaining ingredients to produce paving material;

a conveyor positioned to receive aggregate from the aggregate hopper and operable to convey the aggregate to the mixer;

a scale associated with the conveyor, the scale operable to measure and provide a signal representing a weight of the aggregate being conveyed;

a moisture sensor associated with the aggregate, the moisture sensor operable to measure moisture in the aggregate and to provide an output representing an amount of moisture measured; and a processor operable to receive the signal from the scale and an input representing the amount of moisture measured, the processor operable to determine a dry weight of the aggregate being conveyed from the weight of the aggregate being conveyed and the amount of moisture measured.

14. The mobile paving system of claim 13, wherein the moisture sensor is operable to provide as the output a signal representing the amount of moisture measured, and the processor is coupled to receive as an input the signal from the moisture sensor.

15. The mobile paving system of claim 13, wherein the moisture sensor is operable to measure moisture in terms of a percent moisture of the aggregate and to provide the percent moisture as the amount of moisture measured.

16. The mobile paving system of claim 15, wherein the processor is operable to convert the weight of the aggregate being conveyed to dry weight using the percent moisture measured.

17. The mobile paving system of claim 13, wherein the processor is operable to display the flow of the aggregate in dry weight to an operator of the mobile paving system.

18. The mobile paving system of claim 13, wherein the moisture sensor is mounted inside the aggregate hopper.

19. The mobile paving system of claim 18, wherein the moisture sensor is mounted inside a housing having an open bottom end and movably coupled to the aggregate hopper.

20. The mobile paving system of claim 13, wherein the moisture sensor is mounted outside the aggregate hopper.

21. The mobile paving system of claim 13, wherein the mobile paving system is mounted on a vehicle operable to proceed over a surface to be paved.

22. A method of operating a mobile paving system to produce paving material, comprising:

providing aggregate to be used in producing paving material;

measuring an amount of moisture in the aggregate;

determining a dry weight of aggregate used to produce paving material by converting from volume to dry weight using bulking effect data for the aggregate corresponding to the amount of moisture measured;

controlling a flow of the aggregate to a mixer in response to the determined dry weight; and mixing remaining materials with the aggregate to produce the paving material.

23. The method of claim 22, wherein controlling is accomplished by an operator of the mobile paving system.

24. The method of claim 23, wherein controlling is accomplished by adjusting a gate on an aggregate hopper holding the aggregate.

25. The method of claim 22, wherein controlling is accomplished automatically by a processor in the mobile paving system.

26. The method of claim 22, wherein measuring an amount of moisture comprises measuring a percent moisture of the aggregate.

27. The method of claim 26, wherein determining a dry weight is accomplished using bulking effect data which comprises a plurality of dry weight measurements of the aggregate corresponding to a plurality of percent moisture measurements.

* * * * *